United States Patent [19]

Nouchi et al.

[11] Patent Number: 5,327,315
[45] Date of Patent: Jul. 5, 1994

[54] MAGNETIC RECORDER WITH REFRIGERATION ELEMENT TO LOCALLY COOL TAPE

[75] Inventors: Norimoto Nouchi; Yoshiaki Mizoh; Hiroshi Yoda, all of Osaka; Masaya Sakaguchi, Shiga, all of Japan

[73] Assignee: Matsushita Electric Industrial Co., Ltd., Osaka, Japan

[21] Appl. No.: 937,736

[22] Filed: Sep. 1, 1992

[30] Foreign Application Priority Data

Sep. 2, 1991 [JP] Japan .................................. 3-221492

[51] Int. Cl.⁵ ............................................. G11B 15/00
[52] U.S. Cl. ...................................... 360/137; 360/69; 360/84
[58] Field of Search ................... 360/69, 97.02, 137

[56] References Cited

U.S. PATENT DOCUMENTS

| 3,898,693 | 8/1975 | Chang | 360/73.04 |
| 3,913,661 | 10/1975 | Burg et al. | 165/3 |
| 3,921,208 | 11/1975 | Chapman | 360/17 |
| 4,685,303 | 8/1987 | Branc et al. | 360/69 X |

FOREIGN PATENT DOCUMENTS

| 59-193562 | 11/1984 | Japan | 360/69 |
| 61-240411 | 10/1986 | Japan | . |
| 63-175202 | 7/1988 | Japan | . |
| 2-96996 | 4/1990 | Japan | . |

Primary Examiner—Aristotelis Psitos
Assistant Examiner—James T. Wilson
Attorney, Agent, or Firm—Willian Brinks Hofer Gilson & Lione

[57] ABSTRACT

In order to prevent the staining of magnetic heads of a magnetic recorder in a low humidity environment, a refrigeration device which refrigerates a magnetic tape is positioned so as to engage the magnetic tape prior to the tape engaging the magnetic heads. The refrigeration device comprises either a refrigeration post or a refrigerated semi-closed space and functions to transfer water to the magnetic tape.

25 Claims, 9 Drawing Sheets

MAGNETIC RECORDER WITH REFRIGERATION ELEMENT TO LOCALLY COOL TAPE

BACKGROUND OF THE INVENTION

1. Field of the Invention

The present invention relates to a magnetic recorder which prevents brown stain of the surface of the magnetic head.

2. Description of the Prior Art

In the field of magnetic recording, the high density of recording is realized by metallization of a magnetic recording medium and a magnetic head.

Magnetic recording mediums made of metal are used instead of magnetic recording mediums made from oxide magnetic powders such as $Fe_2O_3$, $Co$—$\gamma Fe_2O_3$ or $CrO_2$. For example, a magnetic recording medium made of magnetic metallic powders of a metal such as Co or Fe or an alloy such as Co-Fe (referred to as MP type magnetic recording medium), and a magnetic recording medium having a magnetic metallic thin film layer of metal such as Co, Ni or Fe or an alloy thereof (referred to as ME type magnetic recording medium are used).

On the other hand, a magnetic head having a magnetic core made from metal of Fe—Al—Si alloy (referred to called as Sendust) or Co—Nb—Zr—Ta amorphous alloy is used instead of a magnetic head made from ferrite.

In a magnetic recorder for high density recording, such a magnetic head is installed in a cylinder rotating at a predetermined speed and a magnetic tape is carried around the cylinder. However, the magnetic recorder has problems as mentioned below in various environments such as in a low humidity environment.

For example, a portion of the magnetic layer of the magnetic recording medium may peel off as the magnetic recording medium contacts the magnetic head. Such peeled-off pieces result in a stain on the magnetic head, and the output of the magnetic head made from metal is substantially degraded large extent. For example, if the magnetic tape is the color brown, a brown stain forms on the magnetic head.

Water content in air due to relative humidity provides a lubrication action so as to allow a magnetic tape to traverse a magnetic head smoothly. However, this contribution of the water content which provide lubrication of magnetic tape running over the magnetic head decreases at low humidity condition. This results to the direct contact of the magnetic tape with the magnetic head.

Japanese Patent laid open Publication 2-96996 discloses a magnetic recorder wherein a thermoelectric refrigeration element responsive to an external signal is provided between a magnetic head and a rotating cylinder in order to generate a substantially high humidity environment around the magnetic head in order to decrease contact noises or noises generated by the rubbing of the tape against the head.

However, there are problems with the action and the reliability of the thermoelectric refrigeration element. More specifically the a magnetic head cannot be cooled enough because the rotating cylinder is used as a heat sink of the exothermic side to prevent excessive heat radiation. Further, in a magnetic recorder wherein many magnetic heads are used, a space for cooling respective magnetic heads with respective refrigeration elements cannot be provided. It is also necessary to provide brushes for current terminals used to supply an electric current into the refrigeration element in the cylinder. However, if a sufficient number of current terminals of the brushes cannot be provided, the electrical contact of all terminals cannot be guaranteed because of dusts in the brushes.

SUMMARY OF THE INVENTION

An object of the present invention is to provide a magnetic recorder which can prevent the brown stain of magnetic heads.

In a magnetic recorder, a rotating cylinder has magnetic heads for recording and reproducing signals on a magnetic tape. A tape transport system transports the magnetic tape around the cylinder. A refrigeration device is provided in the upstream (i.e., prior to the magnetic tape contacting the cylinder) of the cylinder to refrigerate the magnetic tape locally. The refrigeration device may be a refrigeration post or a refrigerated semi-closed space for transferring water to the magnetic tape. In order to operate the refrigeration element efficiently, the refrigeration temperature of the refrigeration device is controlled by detecting the temperature and the humidity around the refrigeration device.

An advantage of the present invention is that the decrease in water amount between a magnetic tape and a magnetic head in a low humidity can be compensated and that the brown stain phenomenon of magnetic heads can be improved.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
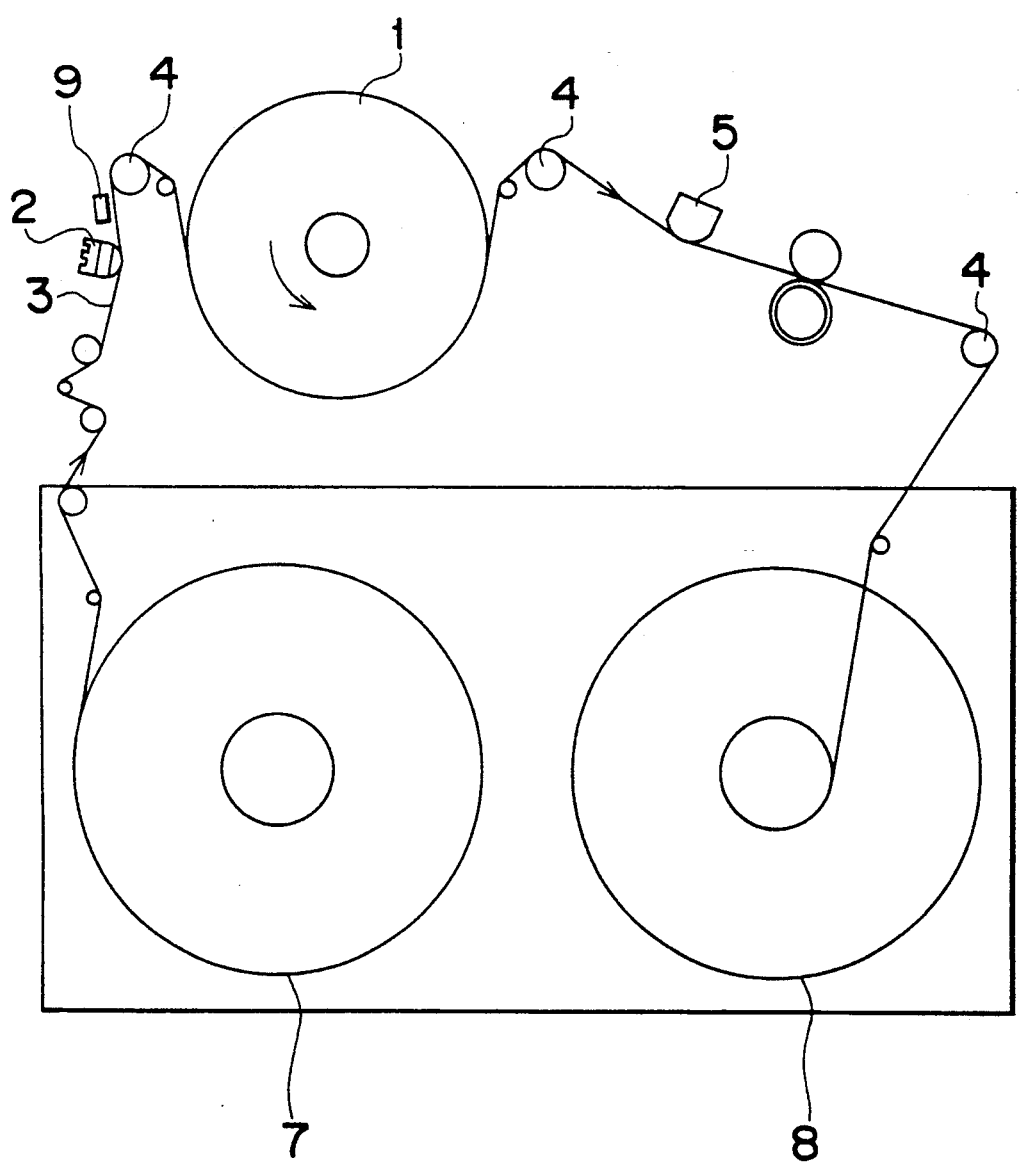
FIG. 1 is a schematic diagram of a magnetic recorder of a first embodiment of the present invention.

Referring now to the drawings, wherein like reference characters designate like or corresponding parts throughout the several views, FIG. 1 shows a schematic diagram of a video cassette recorder, wherein a cylinder 1 which includes for example seven magnetic heads made of metal (not shown) rotates at a fast speed. In the transport system which transports a magnetic tape 3, a post 2 is provided for refrigerating the magnetic tape 3 as well as for giving a tension to the magnetic tape 3 in the upstream of the cylinder 1. The magnetic tape 3 supplied from a supply reel 7 is transported to contact the cylinder 1 for recording and reproducing video signals. The magnetic tape 3 also contacts the refrigeration post 2 as well as other posts 4 for transporting the tape 3 smoothly (for example, a post for tension control, an impedance roller, an inclined post, a capstan and the like) and magnetic heads 5 (a whole width erase head, an audio erase head, an audio control head and the like besides the magnetic heads in the cylinder 1 for recording and reproducing video signals). The magnetic tape 3 is refrigerated by the refrigeration post 2 and the refrigerated magnetic tape 3 makes contact with the magnetic heads in the cylinder 1. The magnetic tape 3 is finally wound in a take-out reel 8.

Figure 2:
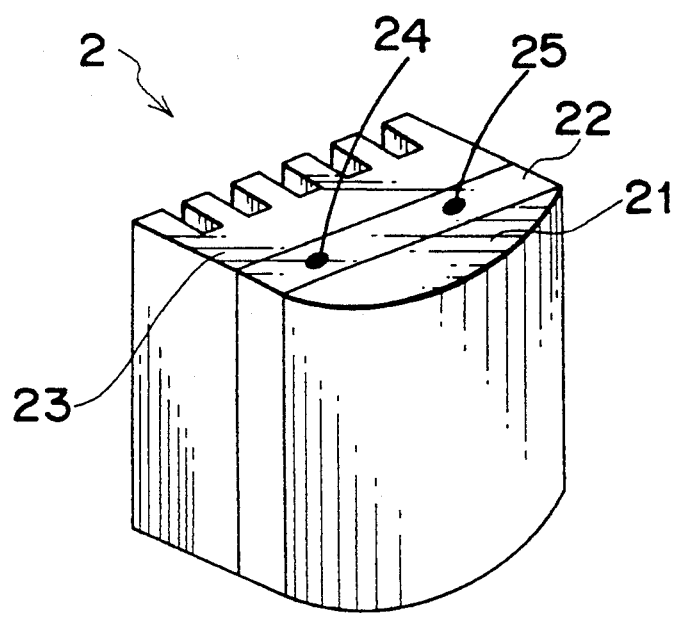
FIG. 2 is a perspective view of a refrigeration post used in the magnetic recording medium according to the present invention.
Figure 3:
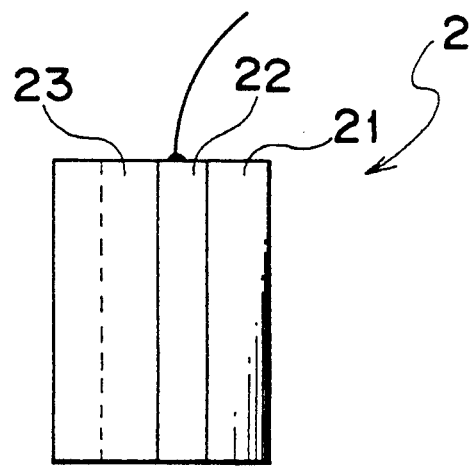
FIG. 3 is a side view of the refrigeration post shown in FIG. 2.

FIGS. 2 and 3 are a perspective view and a side view of the refrigeration post 2, respectively. The post 2 comprises a post member 21 which contacts the magnetic tape 3, a thermoelectric refrigeration element 22 and a fin 23 of aluminum for heat radiation. The post member 21 faces the endothermic side of the thermoelectric refrigeration element 22, while the fin 23 faces the exothermic side of the thermoelectric refrigeration element 22. The reference numerals 24 and 25 denote terminals for supplying a current in the thermoelectric refrigeration element 22.

The thermoelectric refrigeration element 22 has a thermoelectric effect called the Peltier effect wherein when a current flows through junctions between two substances, heat is generated in one of the two junctions while absorbed in the other. Commercial thermoelectric refrigeration elements are available, and the thermoelectric refrigeration element 22 used in the present embodiment is made of a combination of P-type and N-type thermoelectric semiconductors of BiTe. However, it may also be made of a combination of different metals such as Ag—Cu, Bi—Cu, Sb—Bi, Cu—constantan or the like or a combination of P-type and N-type thermoelectric semiconductors such as $Bi_2O_3$ or pbTe.

It is preferable that the post member 21 is made from a porous ceramic or alumina in order to increase the amount of water absorbed due to the refrigeration of the thermoelectric refrigeration element 22. When a ceramic post is used, the water on the surface cools the magnetic tape 3 directly, but the water inside the pores is considered to contribute the refrigeration indirectly for water supply or the like. The post member 21 may also be made from a metal such as brass.

In order to increase the amount of absorbed water on the surface of the magnetic tape 3, it is preferable that the surface of the magnetic layer of the magnetic tape 3 contacts the refrigeration post 2, as in the situation displayed in FIG. 1.

A space for the refrigeration post 2 can be secured sufficiently because the transport system of the magnetic tape 3 is needed to be refrigerated locally or dew condensation occurs locally in the upstream of the cylinder. Further, a cooling fan 26 (FIG. 5) or a cooling water can also be provided at the exothermic side of the thermoelectric refrigeration element 22 for effective heat radiation.

The water generated at the refrigeration post 2 located in the upstream of the cylinder 1 can be transferred to the surface of the magnetic tape 3, so that the decrease in the lubrication between the magnetic tape and the magnetic head in a low humidity environment can be compensated by the water. Thus, the magnetic tape 3 contacts with the magnetic heads in the cylinder 1 in a high humidity environment. Therefore, the brown stain of magnetic heads which occurs in a low humidity condition can be improved.

Figure 4A:
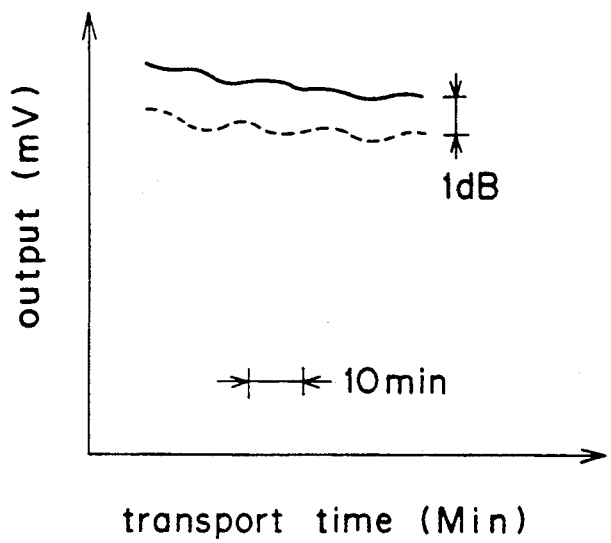
FIG. 4(a) is a graph of the output data of the magnetic head for a commercial magnetic tape.
Figure 4B:
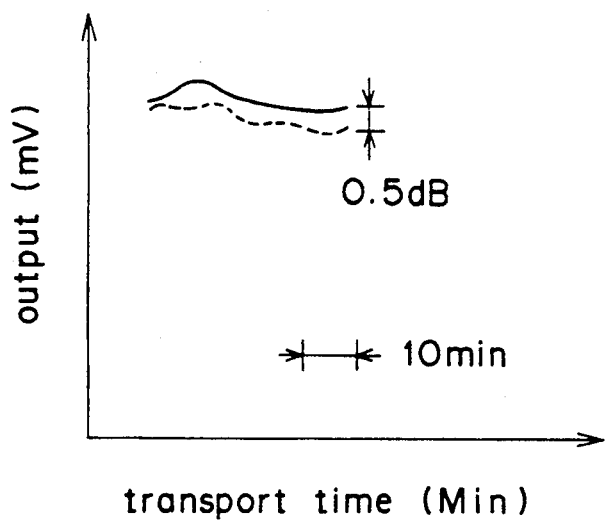
FIG. 4(b) is another graph of the output data on the output of magnetic head for a commercial magnetic tape which causes brown stain easily.

FIG. 4(a) shows the effect of the refrigeration post 2. In a commercial VHS deck, a metal tape (i.e., MP) is transported at 17.4 m/s of the cylinder rotation rate, and the tape is reproduced at 1 μm of recording wavelength in a low humidity environment of 23° C. and 30% RH by using metallic magnetic heads made from amorphous Co—Nb—Zr—Ta. The temperature of the refrigeration post 2 is 4° C. The real line in FIG. 4(a) shows the output of the reproduction of the tape when the refrigeration post 2 is used, whereas the dashed line in FIG. 4(a) shows the output obtained without using the refrigeration post 2. The output is improved by about 1 dB by the refrigeration post 2, and this means that the brown stain is substantially prevented. The optical observation also confirms that the brown stain of magnetic heads decreases. FIG. 4(b) shows the data for another commercial metal tape which is known to be very difficult to prevent the brown stain. Even for such a tape, the output is increased by about 0.5 dB.

Figure 5:
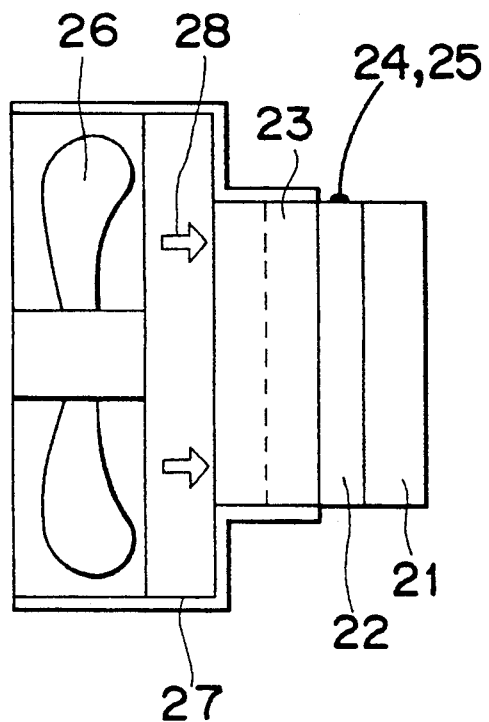
FIG. 5 is a perspective view of a second embodiment of the refrigeration post used in the magnetic recording medium according to the present invention.

FIG. 5 is a perspective view of a second embodiment of the refrigeration post wherein a fan 26 is put in the rear side of the fin 23. The reference numeral 27 denotes a plate of stainless steel for covering the fan 26, and the arrow 28 denotes the direction of the wind caused by the fan 26. The heat radiation is improved by the fan 26 and the cooling of the post member 21 in the endothermic side is enhanced. Water cooling may also be used to radiate heat instead of the fan 26.

Figure 6:
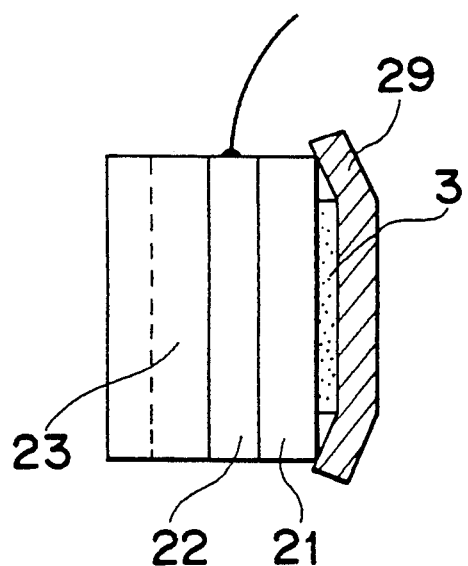
FIG. 6 is a plan view of a third embodiment of the refrigeration post used in the magnetic recording medium according to the present invention.

Further, in order to ensure the absorbed water is uniform on the surface of the magnetic layer or to transfer the water uniformly from the refrigeration post 2 to the magnetic tape 3, it is preferable, as shown in FIG. 6, that a pad 29 made of wool of a length equal to or longer than the tape width is provided in the rear side of the magnetic tape 3 in order to push the magnetic tape 3 to the refrigeration post 2 from the rear surface.

When the refrigeration post 2 is used as a fixed post for a long time or if the refrigeration post 2 makes contact with a magnetic tape 3 at about the same position for a long time, the absorbed water generated at the surface of the refrigeration post 2 may not be transferred or supplied stably for a long time due to the change of the tape tension or to anomalous protrusions on the surface of magnetic tape 3.

Figure 7:
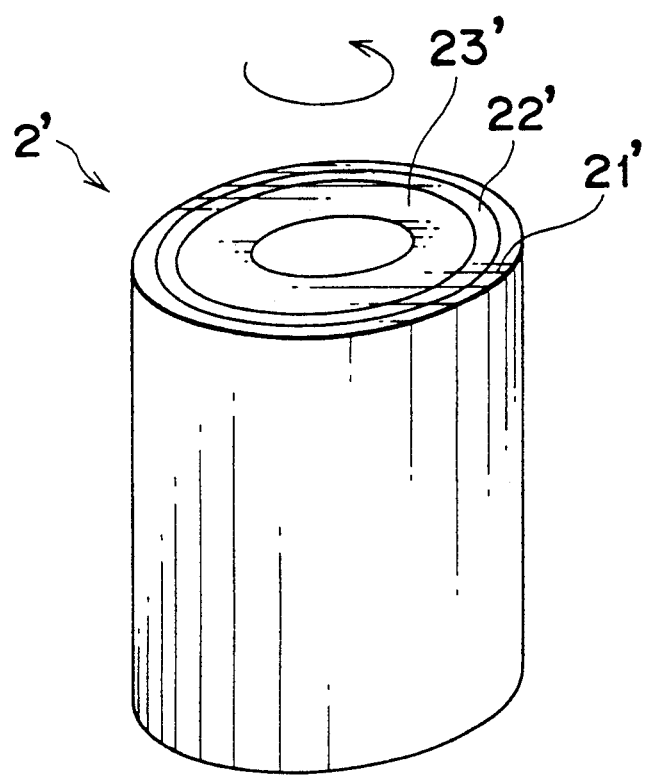
FIG. 7 is a perspective view of a fourth embodiment of the refrigeration post used in the magnetic recording medium according to the present invention.

FIG. 7 shows a fourth embodiment of the refrigeration post 2' which solves this problem. The refrigeration post 2; which rotates, has a cylindrical post member 21' of porous alumina at the endothermic side of a thermoelectric refrigeration element 22' of cylindrical shape and a fin 23' of aluminum at the exothermic side of the thermoelectric refrigeration element 22' of BiTe. The fin 23' is connected with a rotating axis (not shown). When the post 2' contacts the magnetic tape 3, port 2' rotates around the rotating axis.

Furthermore, with regard to all aforementioned embodiments of the present invention, dew condenses on the surface of the post 21 according to the amplitude of the current applied to the thermoelectric refrigeration element 22. As a result of this phenomenon, the water generated on the surface of the refrigeration post 2 can be transferred or supplied to the magnetic tape 3 stably for a long time.

The refrigeration temperature and the dew point are defined as follows: The surface temperature of the post member 21 arranged at the endothermic side decreases due to the operation of the thermoelectric refrigeration element 22. Then, the relative humidity on the surface increases and the amount of water absorbed physically on the surface increases. The temperature of the surface of the post member 21 in this state is called the refrigeration temperature.

When the current supplied to the thermoelectric refrigeration element 22 is increased, the relative humidity of the surface of the post member 21 becomes 100% or the dew condensation phenomenon occurs. When the current is increased further, the surface temperature of the post member 21 decreases and the water amount due to dew condensation increases. The temperature on the surface of the post member 21 in this state is called the dew point.

However, when the dew condensation phenomenon occurs, a magnetic tape 3 may adhere hard to the refrigeration post 2 enough to cut the tape. Therefore, it is preferable to control the area wherein the post 2 makes contact with the tape 3 and the tape tension around the refrigeration post 2.

The surface temperature of the post member 21 can be controlled by a controller to maintain a specified refrigeration temperature or the dew point by adjusting the current supplied to the thermoelectric refrigeration element 22 according to the temperature and the humidity around the refrigeration post 2. It is preferable that a sensor 9 to detect the temperature and the humidity is positioned near the refrigeration post 2, as shown in FIG. 1. However, the sensor may also be embedded in the surface of the post member 21. The voltage applied to the fan 6 for radiation or the like may also be controlled according to the temperature and the humidity.

Figure 8:
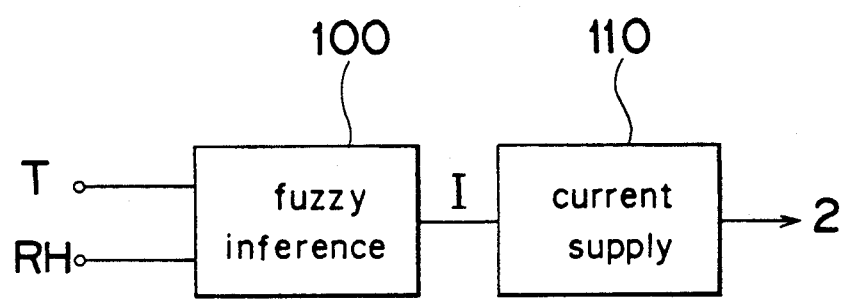
FIG. 8 is a diagram of a fuzzy control system.

The refrigeration temperature or the dew point at the refrigeration post 2 can be controlled smoothly according to the current applied to the thermoelectric refrigeration element 22 by using a fuzzy control system used for the thermoelectric refrigeration element 22 (FIG. 8). The fuzzy control is a technology which has been applied in many industrial fields, (for example FUZZY CONTROL (Michio Sugano, Nikkan Kogyo Shinbunsha, Tokyo, 1988).

The temperature (T) and the humidity (RH) around the refrigeration post 2 are detected with the sensor 9, and they are supplied to a fuzzy inference section 100 to carry out the fuzzy control of the refrigeration temperature or dew point of the refrigeration post 2. The fuzzy inference section 100 performs fuzzy inference according to the input data and supplies the defuzzification operation value or a current necessary for the thermoelectric refrigeration element 22 to a current supply 110. Then, the current supply 110 supplies a current to the thermoelectric refrigeration element 22 according to the defuzzification operation value.

The membership functions of the antecedents in the present embodiment are both temperature and humidity. Further membership functions such as the running tension and head life may be input.

The membership function in the consequent is the current supplied to the thermoelectric refrigeration element 22.

Figure 9A:
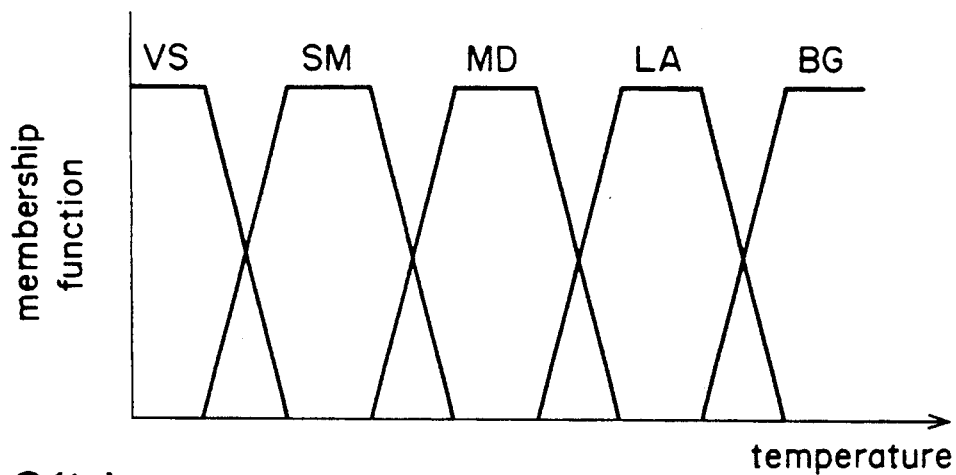
FIGS. 9(a), (b) and (c) are diagrams of a membership function using temperature, humidity and electric current as a variable in order to control the refrigeration temperature of the refrigeration post, respectively.
Figure 9B:
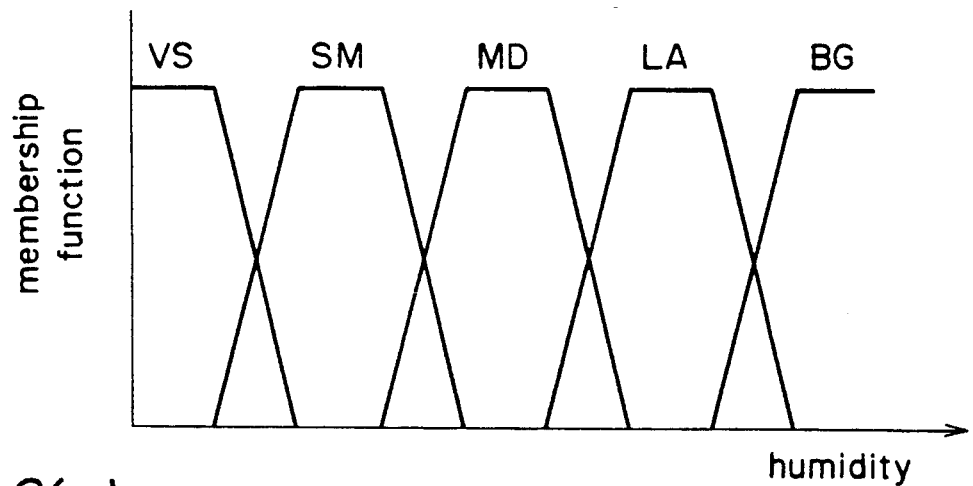
Figure 9C:
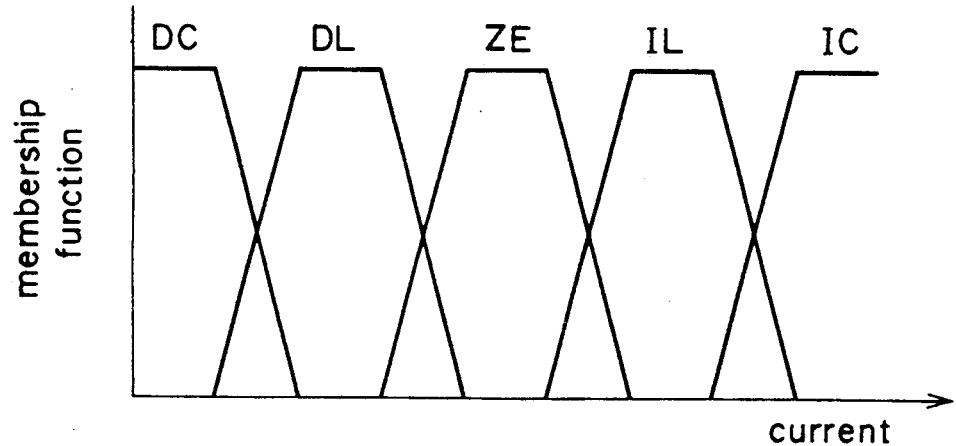

FIGS. 9 (a)–(c) show membership functions of each variable. That is, FIGS. 9(a), (b) and (c) show the membership functions on temperature, on humidity and on the current supplied to the thermoelectric refrigeration element 22, respectively. The abscissa in these drawings represents the value of a variable, while the ordinate represents the membership value or the degree of membership.

The reference signs in FIGS. 9 (a)–(c) mean the following contents.

The output of temperature measurement circuit (FIG. 9(a))
VS: low,
SM: low a little,
MD: about normal,
LA: high a little,
and
BG: high.

The output of humidity measurement circuit (FIG. 9(b))
VS: low,
SM: low a little,
MD: about normal,
LA: high a little,
and
BG: high.

The current control amount of the thermoelectric refrigeration element 22 (FIG. 9 (c))
DC: small,
DL: small a little,
ZE: as it is,
IL: large a little,
and
IC: large.

The fuzzy inference is performed by using the membership functions to get the defuzzification value of the current control of the thermoelectric refrigeration element.

In the inference technique, smooth and fast control can be performed by using the max-mini rule, that is, the conjunction rule of the degree of membership for the antecedents and the disjunction rule of the trapezoid section for the consequent.

Thus, the control of the temperature of the refrigeration post 2 is smooth and fast, and the function and the reliability of the thermoelectric refrigeration element are sufficiently realized. Then, the decrease in the humidity in the low humidity environment between the magnetic tape and the magnetic head is compensated stably for a long time and the magnetic tape contacts with the magnetic head in a substantially high humidity environment.

Thus, the brown stain phenomenon can be improved which occurs when a magnetic recording apparatus is operated in a low humidity condition.

Next, another embodiment of a magnetic recording apparatus is explained wherein water is added to the surface of a magnetic tape 3 at a point in the upstream of the cylinder 1 which contacts with a magnetic tape.

Figure 10:
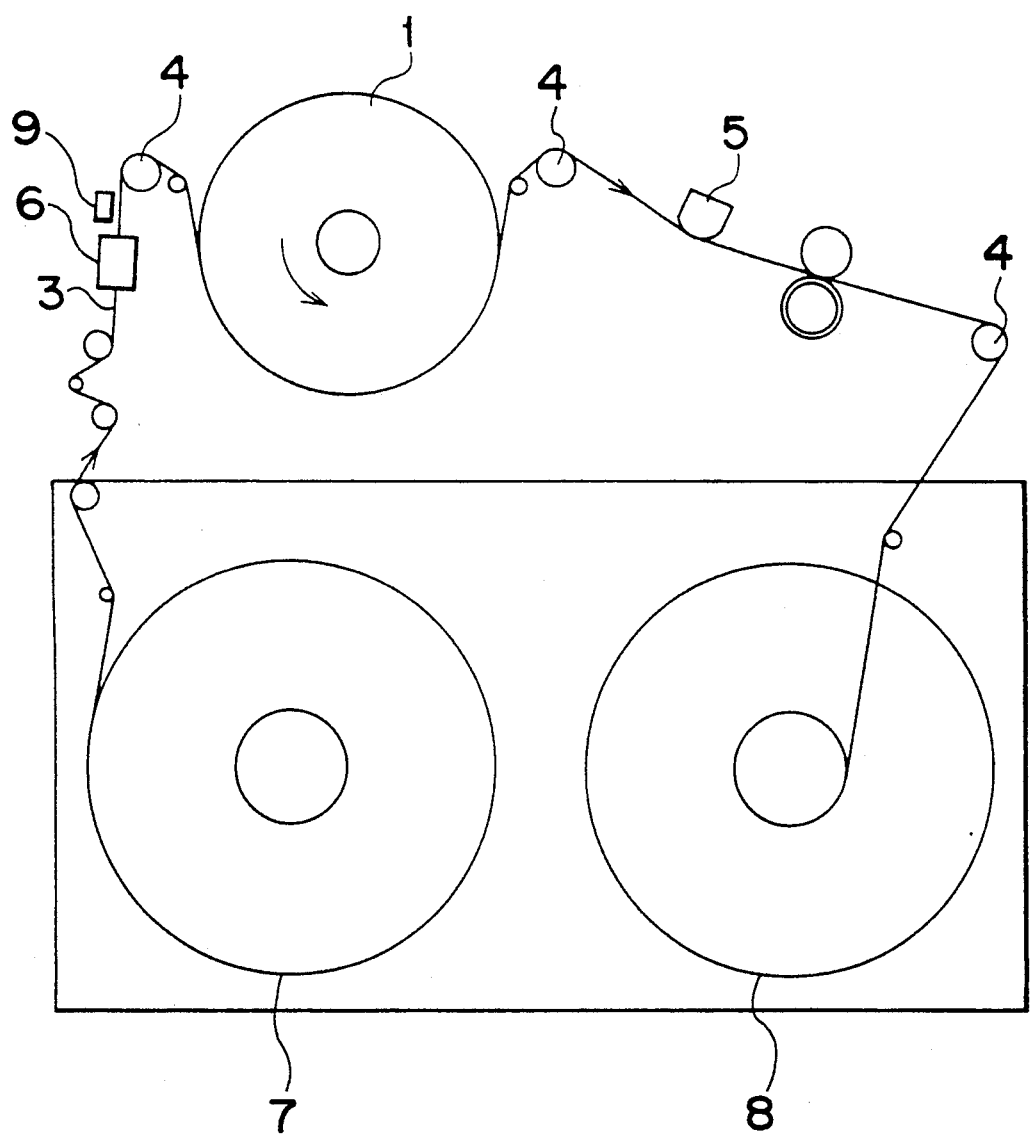
FIG. 10 is a schematic diagram of a second embodiment of the magnetic recorder of the present invention.

FIG. 10 shows a magnetic recorder schematically. This recorder is different from the recorder shown in FIG. 1 in that a refrigeration member 6 made from a semi-closed space is positioned upstream of the cylinder 1 instead of the refrigeration post 2.

Figure 11:
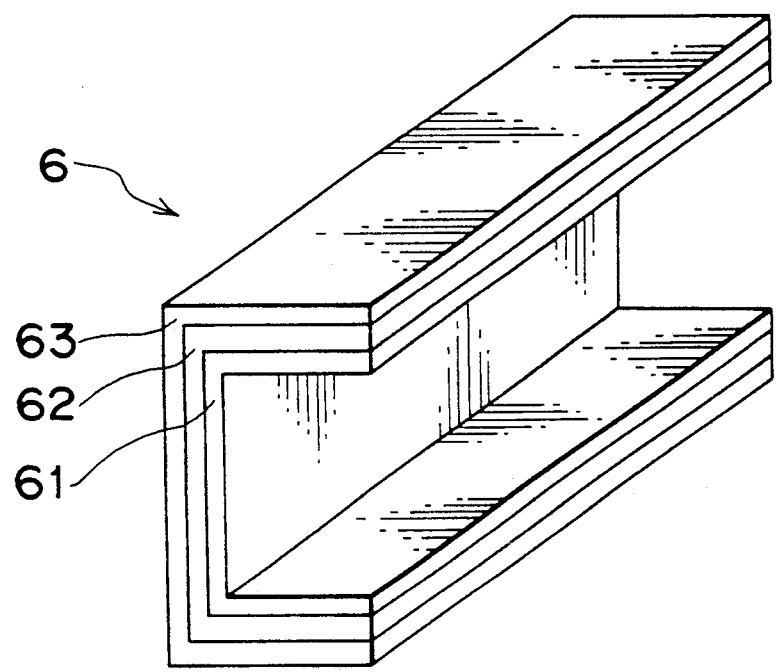
FIG. 11 is a perspective view of a refrigeration member used in the magnetic recorder of the second embodiment.
Figure 12:
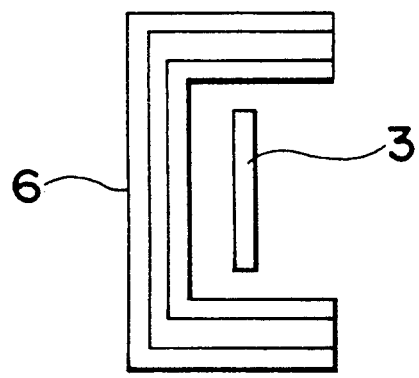
FIG. 12 is a plan view of the refrigeration member used in the magnetic recorder of the second embodiment.

FIGS. 11 and 12 show a perspective view and a side view of the refrigeration member 6. In FIG. 12, a magnetic tape 3 is carried vertically against the paper on which the drawing is displayed. In the refrigeration member 6, a refrigeration plate 61 made from a ceramic or a metal faces the endothermic side of the thermoelectric refrigeration element 62, while a fin 63 of aluminum for heat radiation faces the exothermic side. The relative humidity increases inside, the refrigeration member 6 made from a semi-closed space or on the surface of the refrigeration plate 61 and the water amount physically absorbed increases. Therefore, when a magnetic tape 3 passes in the environment in the semi-closed space of the refrigeration plate 61, water can be transferred to the surface of the magnetic tape 3.

If the refrigeration plate 61 is refrigerated further to condense dew by the thermoelectric refrigeration element 62, additional water can be added to the surface of the magnetic tape 3.

The above-mentioned fuzzy control is also effective as to the control of the refrigeration temperature or the dew point at the surface of the refrigeration plate 61.

In FIG. 10, the reference numeral 9 denotes a sensor for detecting the temperature and the humidity in the magnetic recorder, and the detected values are supplied to the fuzzy inference section 100 mentioned above. It is desirable that the sensor 9 is arranged near the refrigeration member 6.

In FIGS. 11 and 12, the cross section of the semi-closed space has a U-like shape. However, the cross section may be closed perfectly without losing the advantages.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magnetic recorder comprising:
   a rotating cylinder having magnetic heads for recording data on and reproducing data from a magnetic tape,
   a tape transport system for transporting the magnetic tape around the rotating cylinder; and
   a refrigeration post positioned so as to refrigerate the tape prior to the tape contacting the rotating cylinder; said refrigeration post comprising:
   a post member which contacts the magnetic tape;
   a thermoelectric refrigeration element having an endothermic side and an exothermic side, wherein the post member is connected to the endothermic side of the thermoelectric refrigeration element; and
   a heat radiation member connected to the exothermic side of the thermoelectric refrigeration element.

2. The magnetic recorder according to claim 1, wherein said post member is made from a porous ceramic.

3. The magnetic recorder according to claim 1, wherein said post member is made from a metal.

4. The magnetic recorder according to claim 3 wherein said post member comprises brass.

5. The magnetic recorder according to claim 1, wherein said heat radiation member comprises a fin.

6. The magnetic recorder according to claim 1, wherein said heat radiation member comprises a fan.

7. The magnetic recorder according to claim 1, wherein said refrigeration device further comprises a pad member secured to the post member such that the magnetic tape passes between the post member and the pad member, said pad member exerting a force on the magnetic tape such that the surface of the magnetic tape maintains contact with the post member.

8. The magnetic recorder according to claim 1, wherein said post member comprises a circular surface which contacts the magnetic tape, said recorder comprising further a rotation means for allowing said refrigeration device to be rotated by the magnetic tape.

9. The magnetic recorder according to claim 1, further comprising a sensor for detecting the temperature and the humidity around said refrigeration device, and a controller for controlling the temperature of said refrigeration device according to the temperature and the humidity detected by said sensor.

10. The magnetic recorder according to claim 9, wherein said controller is a fuzzy controller.

11. The magnetic recorder according to claim 9 wherein the sensor is embedded in the surface of the post member.

12. A magnetic recorder comprising:
   a rotating cylinder having magnetic heads for recording data on and reproducing data from a magnetic tape,
   a tape transport system for transporting the magnetic tape around the rotating cylinder, and
   a refrigeration member having a semi-closed cooling space through which the tape traverses, said refrigeration member positioned so as to refrigerate the tape prior to the tape contacting the rotating cylinder, said refrigeration member comprising:
   a refrigeration plate having a semi-closed space to surround the magnetic tape;
   a thermoelectric refrigeration element having an endothermic side and a exothermic side, wherein the refrigeration plate is connected to the endothermic side of the thermoelectric refrigeration element; and
   a heat radiation member connected to the exothermic side of the thermoelectric refrigeration element.

13. The magnetic recorder according to claim 12, wherein said refrigeration plate has a U-shape so as to form a semi-closed space.

14. The magnetic recorder according to claim 12, wherein said refrigeration plate is made from a porous ceramic.

15. The magnetic recorder according to claim 12, wherein said refrigeration plate is made from a metal.

16. The magnetic recorder according to claim 12, wherein said heat radiation member is a fin.

17. The magnetic recorder according to claim 12, further comprising a sensor for detecting the temperature and humidity around said refrigeration device, and a controller for controlling the temperature of said refrigeration device according to the temperature and humidity detected by said sensor.

18. The magnetic recorder according to claim 17, wherein said controller is a fuzzy controller.

19. The magnetic recorder according to claim 17 wherein the sensor is embedded in the surface of the refrigeration plate.

20. A magnetic recorder comprising:
a rotating cylinder having magnetic heads for recording data on and reproducing data from a magnetic tape,
a tape transport system for transporting the magnetic tape around the cylinder; and
a refrigeration post positioned so as to refrigerate the tape prior to the tape contacting the rotating cylinder, said refrigeration post comprising:
a heat radiation member having a cylindrical shape forming an inner and outer surface;
a thermoelectric refrigeration element having a cylindrical shape so as to form an inner exothermic surface and an outer endothermic surface, wherein the inner exothermic surface is secured to the outer surface of the heat radiation member;
a post member having a cylindrical shape so as to form an inner and outer surface wherein the inner surface is secured to the outer endothermic surface of the thermoelectric refrigeration element; and
rotation means connected to the heat radiation member so as to allow the post member to be rotated by the magnetic tape.

21. The magnetic recorder according to claim 20 wherein said post member is made from a porous ceramic.

22. The magnetic recorder according to claim 20 wherein said post member is made from a metal.

23. The magnetic recorder according to claim 20 further comprising:
a sensor for detecting the temperature and the humidity around said refrigeration post; and
a controller for controlling the temperature of the refrigeration device according to the temperature and the humidity detected by the sensor.

24. The magnetic recorder according to claim 23 wherein the sensor is embedded in the surface of the post member.

25. The magnetic recorder according to claim 23 wherein said controller is a fuzzy controller.

* * * * *

UNITED STATES PATENT AND TRADEMARK OFFICE
CERTIFICATE OF CORRECTION

PATENT NO. : 5,327,315
DATED : July 5, 1994
INVENTOR(S) : Norimoto Nouchi et al.

It is certified that error appears in the above-indentified patent and that said Letters Patent is hereby corrected as shown below:

Column 1, Line 27: "to called" should read --to--.

Column 1, Line 41: "degraded" should read --degraded.--.

Column 1, Line 49: "results" should read --results in--.

Column 1, Line 62: "the a" should read --the--.

Column 2, Line 28: "humidity" should read --humidity condition--.

Column 2, Line 47: "data on the output" should read --data--.

Column 2, Line 49: "stain" should read --stains--.

Column 5, Line 3: "port" should read --post--.

UNITED STATES PATENT AND TRADEMARK OFFICE
CERTIFICATE OF CORRECTION

PATENT NO. : 5,327,315
DATED : July 5, 1994
INVENTOR(S) : Norimoto Nouchi et al.

It is certified that error appears in the above-indentified patent and that said Letters Patent is hereby corrected as shown below:

Column 5, Line 14: "follows:" should read --follows--.

Column 5, Line 56: "(for" should read --for--.

Signed and Sealed this

Fifth Day of December, 1995

Attest:

BRUCE LEHMAN

*Attesting Officer*      *Commissioner of Patents and Trademarks*